Nov. 28, 1933.    G. T. SCHRODER    1,936,644
INSECT TRAP
Filed June 3, 1929
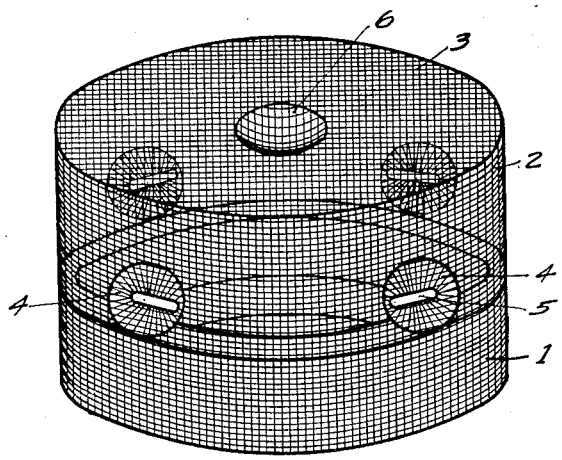
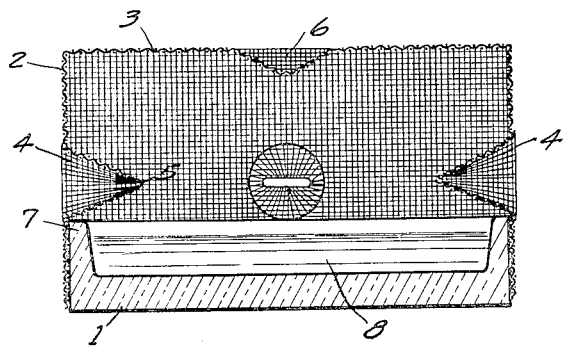
INVENTOR
George T. Schroder
BY
his ATTORNEY Patented Nov. 28, 1933

1,936,644

UNITED STATES PATENT OFFICE 1,936,644

INSECT TRAP

George T. Schroder, New York, N. Y.

Application June 3, 1929. Serial No. 368,080

2 Claims. (Cl. 43—121)

This invention relates to insect traps with particular reference to a trap for roaches, croton bugs and other similar vermin pests, having as particular features that the bottom of the trap is of transparent or translucent material and serves as a large bait cup, while the upper portion of the trap is made preferably of wire gauze and provided with converging entrances of the same or similar gauze.

The main object of my invention is to provide a trap for the classes of insects named which so exposes bait to view and apprehension of said insects as to render the same well nigh irresistible to them, and yet so constructed as to surely retain them within when once caught in the trap.

Another object of my trap is to construct the same of such simple, yet substantial materials as to render the same very durable to permit scalding the insects without damage to the trap.

A further feature is to make the bottom of the trap of glass, celluloid or other suitable material in order to permit the insects outside the trap to clearly see the bait within said bottom, and it is also an object to have the bottom sufficiently deep to contain a relatively large amount of liquid bait similar to milk or soup wherein many caught insects may drown.

Various other objects and features of the invention will appear more fully as the specification proceeds.

In the accompanying drawing;

Fig. 1 is a view of a trap made according to my invention and embodying the novel and useful features thereof.

Fig. 2 is a cross section of the same revealing the construction of the trap more fully.

Fig. 3 is a view of a modification of the bottom of the trap.

Throughout the views, the same reference numerals indicate the same or duplicate parts.

As a result of thorough research and long series of experiments, it has developed that roaches can most easily be caught in traps which expose food in clear view and within smelling distance when the insects are round about the trap set for them, and that no material having any body to it, except glass and the like, is permissible. Hence, wire gauze in the form of a hood over a transparent bottom makes an excellent combination to attract such insects when baited properly, the hood having certain features serving to both catch the roaches and also normally to support the hood on the glass bottom.

I have in the course of my investigations filed a previous application, copending with this, the serial number being:—343,782, filed March 1, 1929, and the present application is a continuation in part of the same.

In the practice of my present invention, a dished bottom 1 of glass, celluloid, or any other suitable material constitutes a bait cup to hold a quantity of liquid such as milk or fish soup, or the like at 8. A wire gauze hood having a bounding wall 2 is mounted removably upon the glass bottom, and is covered by a gauze top 3 in which a depression 6 is formed. The purpose of the depression is to guide liquids into the center of the bottom when it is desired to bait the trap by pouring the liquid through the top, avoiding opening the trap for baiting. In the bounding wall 2 a plurality of converging gauze cones or funnels 4, 4 are formed, piercing said bounding wall to form entrances for the insects, each cone or entrance funnel terminating inwardly in a generally oval or reticulated inner opening 5 to correspond generally with the cross section of a roach or bug, and when seen by such insects from the interior to nearly blend in a horizontal direction with the rest of the wall and give no obvious clue to any exit. Manifestly, when the gauze portion of the trap is placed in position upon the bottom, the wall 2 will tend to ride down upon the bottom until the funnels 4, 4 rest upon the upper edge 7 of the bottom, and the funnels and the bottom have thus the office of locating the hood upon the bottom beside their other duties or purposes.

In my former application, I also illustrated another form of bottom, herein shown in Fig. 3, the main body being noted 9, while a shoulder 10 is designed to allow the gauze hood or upper portion of the trap to rest thereon.

Having now fully described my invention, I claim:—

1. An insect trap comprising a concave bottom member of transparent material, an upper hood member of gauze on said bottom member and a plurality of gauge entrance funnels in the side of said hood member, said funnels resting on said bottom member to support said hood in place.

2. A cockroach trap comprising, in combination, a circular bottom member of transparent liquid-impervious material, said member being formed with an integral upstanding annular rim whereby liquid bait may be retained therein, a cylindrical member of flexible wire gauze having an internal diameter substantially the same as the external diameter of said annular rim whereby said cylindrical member fits over said annular rim and is removable therefrom, a flat top of wire gauze secured to said cylindrical member, the openings between the individual wires of the gauze being large enough so that an insect within the trap is visible from the outside, and a funnel-shaped entrance member of wire gauze having its large open end secured in an opening in said cylindrical member and extending inwardly and terminating in a narrow slot-like opening, said slot-like opening, when viewed from within said trap, blending with the openings between the wires in the wire gauze back ground.

GEORGE T. SCHRODER.